US007395875B2

(12) United States Patent
Krondorfer et al.

(10) Patent No.: US 7,395,875 B2
(45) Date of Patent: Jul. 8, 2008

(54) RECHARGEABLE BATTERY-OPERATED HAND MACHINE TOOL

(75) Inventors: Harald Krondorfer, Hundelein, IL (US); Volker Bosch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 11/103,261

(22) Filed: Apr. 11, 2005

(65) Prior Publication Data

US 2005/0230135 A1 Oct. 20, 2005

(30) Foreign Application Priority Data

Apr. 14, 2004 (DE) ....................... 10 2004 017 946

(51) Int. Cl.
*H02J 7/00* (2006.01)

(52) U.S. Cl. ......................... 173/217; 173/176; 310/47; 310/50; 320/114; 320/135

(58) Field of Classification Search ................. 173/217, 173/2, 5, 11, 176, 179; 310/47, 50, 68 R; 318/432, 434; 388/937; 320/106, 114, 112, 320/135
See application file for complete search history.

(56) References Cited

U.S. PATENT DOCUMENTS

| | | | | |
|---|---|---|---|---|
| 4,536,688 | A * | 8/1985 | Roger | 318/490 |
| 5,054,563 | A * | 10/1991 | Zapf | 173/217 |
| 5,083,620 | A * | 1/1992 | Fushiya et al. | 173/217 |
| 5,226,460 | A * | 7/1993 | Johannes | 140/88 |
| 5,657,417 | A * | 8/1997 | Di Troia | 388/829 |
| 5,731,673 | A * | 3/1998 | Gilmore | 318/432 |
| 5,868,208 | A * | 2/1999 | Peisert et al. | 173/178 |
| 6,206,538 | B1 | 3/2001 | Lemoine | |
| 6,431,289 | B1 * | 8/2002 | Potter et al. | 173/47 |
| 6,446,734 | B1 * | 9/2002 | Williams et al. | 173/1 |
| 6,508,313 | B1 * | 1/2003 | Carney et al. | 173/1 |
| 6,729,414 | B2 * | 5/2004 | Cooper et al. | 173/217 |
| 6,834,730 | B2 * | 12/2004 | Gass et al. | 173/2 |
| 6,836,614 | B2 * | 12/2004 | Gilmore | 388/811 |
| 6,883,621 | B1 * | 4/2005 | Lin | 173/217 |
| 6,971,454 | B2 * | 12/2005 | Bogue | 173/2 |
| 6,983,809 | B2 * | 1/2006 | Leitenberger et al. | 173/176 |
| 7,112,934 | B2 * | 9/2006 | Gilmore | 318/432 |
| 7,235,940 | B2 * | 6/2007 | Bosch et al. | 318/432 |
| 2001/0042631 | A1 * | 11/2001 | Carrier | 173/217 |
| 2005/0073282 | A1 * | 4/2005 | Carrier et al. | 320/106 |
| 2005/0221654 | A1 * | 10/2005 | Phillips et al. | 439/347 |

OTHER PUBLICATIONS

U.S. Appl. No. 60/507,955, filed Oct. 2003, Roby, Rouse.*

* cited by examiner

*Primary Examiner*—Thanh K. Truong
*Assistant Examiner*—Michelle Lopez
(74) *Attorney, Agent, or Firm*—Michael J. Striker

(57) ABSTRACT

The invention is based on a rechargeable battery-operated hand machine tool (10) having an electric drive motor (18) accommodated in a housing (12) and powered by a rechargeable battery (20), which motor is used to drive a tool (16), and having an actuating means (14) for switching the drive motor (18) on and off.

A mechanism (22) is provided, which is capable of reducing the discharging of the battery (20) during operation.

13 Claims, 1 Drawing Sheet

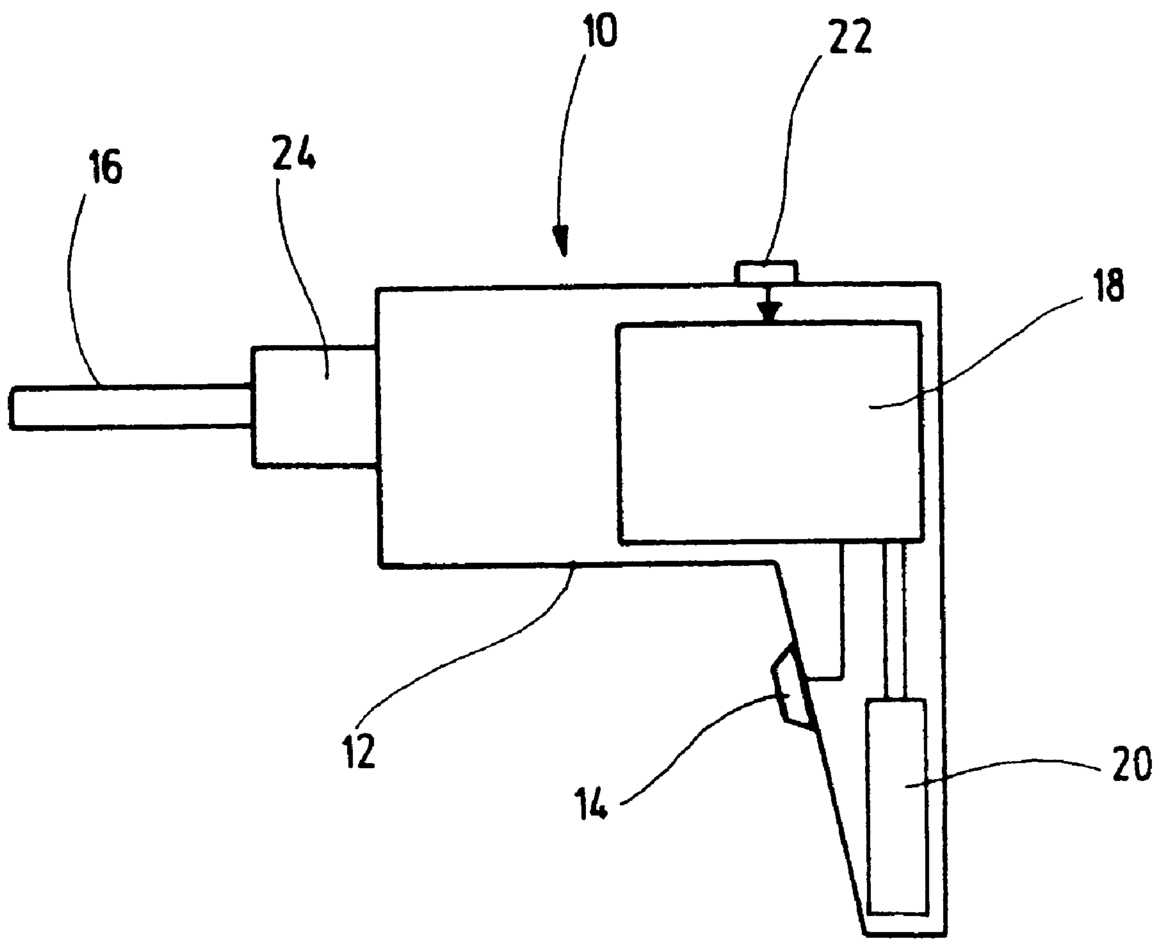
10
22
16
24
18
12
20
14

RECHARGEABLE BATTERY-OPERATED HAND MACHINE TOOL

BACKGROUND OF THE INVENTION

The invention is based on a rechargeable battery-operated hand machine tool.

Rechargeable battery-operated hand machine tools have an on/off switch that permits the operator to initiate operation of the hand machine tool in a controlled way. Usually, this switch can be used to set the speed within a certain range. It is therefore essentially up to the operator to determine the operating behavior and thus the running time of the unit on a single charge of the battery. In designing the hand machine tool, a compromise must always be found between high dynamics of the hand machine tool and favorable efficiency with the accompanying long-running time of the hand machine tool on a single battery charge.

If the hand machine tool is designed for high-efficiency, then under certain circumstances, this can give the operator the impression that the tool is not very powerful. On the other hand, if the hand machine tool is designed for high dynamics, then this does in fact give the operator the impression that the hand machine tool is powerful, but the running time of the hand machine tool on a single battery charge decreases sharply.

SUMMARY OF THE INVENTION

A rechargeable battery-operated hand machine tool according to the present invention, having an electric drive motor accommodated in a housing and powered by a rechargeable battery, which motor is used to drive a tool, and having an actuating means for switching the drive motor on and off, is provided with a mechanism capable of reducing the discharging of the battery during operation. It is advantageous to give the operator a choice as to whether the hand machine tool will operated with high dynamics and rapid battery discharge or in an energy-saving mode with a high degree of motor efficiency. In terms of its operating mode, the hand machine tool can still be designed in the same way, preferably for maximum dynamics, and the operator can optionally select an energy-saving operating mode through a corresponding switch position or a corresponding setting of the mechanism. The present invention is particularly useful for rechargeable battery-operated hand machine tools in which a tool with a comparatively high mass moment of inertia rotates at a high speed such as circular saws, right-angle grinders, planes, wall chasers, or power scythes.

Preferably, an operator can actuate the mechanism so as to explicitly activate, deactivate, or optionally proportion an energy-saving mode of the hand machine tool that is easy on the battery.

Preferably, the mechanism is located separate from the actuating means and/or from a possibly provided set point adjuster for controlling the speed of the drive motor, which makes it possible to prevent an accidental and undesirable actuation.

In a favorable embodiment, the mechanism is embodied in the form of a switch with at least one locked position. The energy-saving mode can be switched on or off. Alternatively, the mechanism can be a smooth adjusting mechanism, which can be embodied, for example, in the form of a rotary potentiometer or a slide controller. In this case, it is possible to proportion the intensity of the energy-saving mode and therefore the discharging of the battery.

Preferably, when the mechanism is actuated, an acceleration of the tool can be reduced and/or an idle speed of the drive motor can be reduced and/or an operation of the drive motor with increased efficiency can be set. Preferably, the drive motor can be operated at its maximum efficiency.

BRIEF DESCRIPTION OF THE DRAWINGS

Additional embodiment forms, aspects, and advantages of the present invention, independent of their inclusion in the claims, also ensue from the exemplary embodiments of the present invention explained below in conjunction with the drawings, without limitation as to their general applicability.

The sole FIGURE shows a very schematic depiction of a rechargeable battery-driven hand machine tool.

DETAILED DESCRIPTION OF THE PREFERRED EMBODIMENTS

The sole FIGURE shows a very schematic depiction of a rechargeable battery-driven hand machine tool 10 having an electric drive motor 18 accommodated in a housing 12 and powered by a rechargeable battery 20, which motor is used to drive a tool 16 that is held in a tool socket 24 of the hand machine tool 10. The hand machine tool 10 is provided with an actuating means 14 for switching the drive motor 18 on and off. On the housing 12, a means or mechanism 22 is provided, which is capable of reducing the discharging of the battery 20 during operation.

The mechanism 22 is located separate from the actuating means 14 and/or from a set point adjuster that is possibly provided. If the hand machine tool 10 is provided with a conventional set point adjuster of this kind, then it is possible to control a speed or a torque of the drive motor 18.

The mechanism 22 can be embodied in the form of an on/off switch or in the form of a slide switch with at least one locked position. Optionally, the mechanism 22 can be a smooth adjusting mechanism, for example a rotary potentiometer with a rotating knob or a slide controller.

When the mechanism 22 is actuated, an acceleration of the tool 16 can be reduced and/or an idle speed of the drive motor 18 can be reduced and/or an operation of the drive motor 18 with increased efficiency can be set; in particular, the drive motor 18 can then be operated at its maximum efficiency. A control unit, not shown, can also be provided, which controls the drive motor 18 in an appropriate manner.

A first end position of the mechanism 22 permits the hand machine tool 10 to be operated with maximum dynamics while another end position of the mechanism 22 permits the hand machine tool to be operated with maximum energy savings or energy efficiency.

In an advantageous operating mode, it is possible for the hand machine tool 10, independent of its operating conditions, to be switched into an energy-saving mode in which a discharging of the battery 20 is slowed. Preferably, an acceleration of the tool 16 from a maximum value to a lower value is reduced, an idle speed is adjusted from a maximum value to a reduced value, and/or an operation of the drive motor 18 is set so that it is operated with an increased efficiency, preferably with its maximum efficiency. These measures can be executed individually or in any combination with one another.

The invention claimed is:

1. A battery operated hand-held machine tool, comprising a housing; an electric drive motor disposed in said housing to be powered by a battery for driving a tool; actuating means for switching said drive motor so as to adjust said drive motor to positions between on and off positions; and user-operable mode selection means actuable for selection of an operating mode enabling motor operation for maximum dynamics with relatively rapid battery discharge, and an energy-saving mode for motor operation with reduced battery discharge, said mode selection means being additional to and separate from a user-operable set point adjuster, for setting a motor speed or torque, with which the machine tool is provided.

2. A battery operated hand-held machine tool according to claim 1, wherein said mode selection means is a switch having at least one locked latched position.

3. A battery operated hand-held machine tool according to claim 1, wherein said mode selection means is a stepless adjusting means.

4. A battery operated hand-held machine tool according to claim 3, wherein said stepless adjusting means is a rotary potentiometer.

5. A battery operated hand-held machine tool according to claim 3, wherein said stepless adjusting means is a slide regulator.

6. A battery operated hand-held machine tool according to claim 3, wherein said user-operable mode selection means enables smooth adjustment, so as to proportion the intensity of the energy-saving mode.

7. A battery operated hand-held machine tool according to claim 1, wherein said mode selection means is configured so that an acceleration of the tool is reduceable upon actuation of said mode selection means.

8. A battery operated hand-held machine tool according to claim 1, wherein said mode selection means is configured so that an idling speed of said drive motor is reduceable upon actuation of said mode selection means.

9. A battery operated hand-held machine tool according to claim 1, wherein said mode selection means is configured so that an operation of said drive motor is set for greater efficiency upon actuation of said mode selection means.

10. A battery operated hand-held machine tool according to claim 9, wherein said drive motor is operatable at its maximum level efficiency.

11. A battery operated hand-held machine tool, comprising a housing; an electric drive motor disposed in said housing to be powered by a battery for driving a tool; actuating means for switching said drive motor so as to adjust said drive motor to positions between on and off positions; and user-operable mode selection means actuable for selection of an operating mode enabling motor operation for maximum dynamics with relatively rapid battery discharge, and an energy-saving mode for motor operation with reduced battery discharge, said mode selection means being additional to and separate from a user-operable set point adjuster, for setting a motor speed or torque, with which the machine tool is provided, wherein said user operable mode selection means is configured so that the energy-saving mode is achievable by adjusting at least one of an acceleration of the tool, an idling speed of said drive motor and an efficiency of operation of said drive motor.

12. A battery operated hand-held machine tool according to claim 11, wherein said user-operable mode selection means is configured so that the energy-saving mode is achievable by adjusting a combination of at least two parameters selected from the group consisting of an acceleration of the tool, an idling speed of said drive motor, and an efficiency operation of said drive motor.

13. A battery operated hand-held machine tool according to claim 11, wherein said user-operable mode selection means is configured so that the energy-saving mode is achievable by adjusting a combination of parameters selected from the group consisting of an acceleration of the tool, an idling speed of said drive motor, and an efficiency operation of said drive motor.

* * * * *